US012582143B1

(12) United States Patent
Fan

(10) Patent No.: US 12,582,143 B1
(45) Date of Patent: Mar. 24, 2026

(54) AUTOMATIC IGNITION-TYPE BEVERAGE SMOKING DEVICE

(71) Applicant: Shenzhen kaisiwei technology co., ltd, Shenzhen City (CN)

(72) Inventor: Yongbing Fan, Yangchun City (CN)

(73) Assignee: Shenzhen kaisiwei technology co., ltd, Shenzhen City (CN)

( * ) Notice: Subject to any disclaimer, the term of this patent is extended or adjusted under 35 U.S.C. 154(b) by 0 days.

(21) Appl. No.: 19/328,234

(22) Filed: Sep. 15, 2025

(30) Foreign Application Priority Data

Sep. 10, 2025 (CN) .......................... 202521949623.3

(51) Int. Cl.
A23L 2/54 (2006.01)
B01F 23/236 (2022.01)
B01F 101/14 (2022.01)

(52) U.S. Cl.
CPC ............ A23L 2/54 (2013.01); B01F 23/2362 (2022.01); B01F 2101/14 (2022.01)

(58) Field of Classification Search
CPC .... A23L 2/54; B01F 23/2362; B01F 2101/14; A47J 37/0754; A47J 37/0786; A47J 37/0704

USPC ......... 99/339, 314, 352, 467, 482, 450, 419, 99/481, 473; 426/314, 578, 634, 618
See application file for complete search history.

(56) References Cited

U.S. PATENT DOCUMENTS 8,490,614 B1 * 7/2013 Gregory .............. A47J 37/0754
126/41 R

* cited by examiner

*Primary Examiner* — Phuong T Nguyen
(74) *Attorney, Agent, or Firm* — Che-Yang Chen

(57) ABSTRACT

An automatic ignition-type beverage smoking device comprises a main body, a base seat and an automatically-igniting apparatus, wherein the base seat is rotatably disposed on the main body, and the automatically-igniting apparatus is accommodated inside the main body, and the automatically-igniting apparatus includes an ignition needle, at least part of which penetrates the fixing frame; a drawer unit is detachably set inside the base seat, and the ignition needle pokes into a burning chamber, so that smoke generated by burning combustibles diffuses to the outside through a smoke releasing hole. The automatic ignition-type beverage smoking device makes it possible to not only improve convenience and safety, but also achieve efficiently producing smoke and easily cleaning.

14 Claims, 10 Drawing Sheets

122

1241

123

120

AUTOMATIC IGNITION-TYPE BEVERAGE SMOKING DEVICE

FIELD OF THE INVENTION

The present invention relates to the technical field of smoking, in particular to an automatic ignition-type beverage smoking device.

BACKGROUND OF THE INVENTION

A device for smoking ingredients is used to smoke food ingredients in the field of processing food, and mainly serves a function of producing smoke that acts on food ingredients (such as beverages, desserts, roast chicken, roast duck, etc.) by way of burning combustibles, so that the molecules in the smoke except tar and carbon particles dissolve in moisture of food or ingredients in a container. During operation, smoke comes into contact with beverages or ingredients in a container to deliver flavors, thereupon giving food a smoky flavor and adding flavor complexity, such as a smoky flavor to cocktails.

A traditional device for smoking ingredients needs to be used with a separate ignition device such as a match and a lighter, which produces a flame that ignites combustibles inside the device for smoking ingredients, thereupon then produces flavored smoke. However, it is not convenient to operate such a traditional device, and the flame will cause severe safety hazards. In addition, the traditional device for smoking ingredients also has problems such as slowness in rate of burning combustibles, inconvenience in replacement, and difficulty in cleaning residues.

Therefore, the present invention aims how to design an automatic ignition-type beverage smoking device to overcome the above the technical problem.

SUMMARY OF THE INVENTION

In view of the deficiencies of the prior art, the present invention provides an automatic ignition-type beverage smoking device, making it possible to not only improve convenience and safety, but also achieve efficiently producing smoke and easily cleaning.

The objective of the present invention is achieved through the following technical solutions.

An automatic ignition-type beverage smoking device includes a main body, a base seat and an automatically-igniting apparatus, in which the base seat is rotatably disposed on the main body, and the automatically-igniting apparatus is accommodated inside the main body;

the main body includes a housing and a bottom plate, and a control mainboard electrically connected with the automatically-igniting apparatus is arranged inside the housing, and a fixing frame is disposed on the bottom plate, and the automatically-igniting apparatus is disposed on the fixing frame, and the automatically-igniting apparatus includes an ignition needle, at least part of which penetrates the fixing frame;

a drawer unit is detachably set inside the base seat, and the drawer unit includes a drawer body and a supporting piece, and the drawer body has an accommodating chamber, and the supporting piece is separably accommodated in the accommodating chamber, and a smoke releasing hole is set on the supporting piece, and the supporting piece is provided with a burning chamber for containing a combustible, and the ignition needle pokes into the burning chamber, so that smoke generated by burning combustibles diffuses to the outside through the smoke releasing hole.

In one of embodiments, a dodging groove is opened on an outer wall of the accommodating cavity, and a concave portion that fits with the dodging groove is set on an edge of the supporting piece.

In one of embodiments, the drawer body has a handle, and a position-restricting protrusion is set on the handle, and a position-restricting groove that fits with the position-restricting protrusion is set on the base seat.

In one of embodiments, the edge of the supporting piece extends outwards to form an outer edge, and an extension block that fits with the outer edge is set on an inner wall of the accommodating cavity.

In one of embodiments, a rotating column is disposed on the base seat, and the rotating column has a notch, and a locking groove is set on the rotating column, and a locking washer is arranged in the locking groove; a propping sleeve that fits with the rotating column is set the bottom plate, and the rotating column penetrates the propping sleeve, which is clamped by the locking washer;

a dodging channel is set on the base seat, and the dodging channel is conjured to dodge the ignition needle when the base seat rotates, and a dodging groove that fits with the dodging channel is set on an outer wall of the accommodating cavity.

In one of embodiments, a plurality of convex edges are uniformly arranged in a circumferential direction of an outer side of the rotating column, and a plurality of strip-shaped grooves that fit with the plurality of convex edge respectively are uniformly arranged in a circumferential direction of an inner side of the propping sleeve.

In one of embodiments, a plugging tab that fits with the dodging channel is set on the bottom plate, and the plugging tab is accommodated inside the dodging channel.

In one of embodiments, a LED lamp assembly is disposed on the base seat, and the LED lamp assembly is electrically connected with the control mainboard by means of a wire, and the wire passes through the rotating column.

In one of embodiments, the main body includes a top cover, and a ventilation gap is formed between the top cover and the housing, and the ventilation gap connects the outside with the interior of the main body, and an air-delivering hole is set on the fixing frame, and the air-delivering hole connects the interior of the main body with the burning chamber.

In one of embodiments, an air blower unit is disposed inside the main body, and the air blower unit is fixedly mounted on the fixing frame, and the air blower unit is electrically connected with the control mainboard, and the air blower unit is configured to drive air to flow inside the main body.

In one of embodiments, an operation panel is set on the top cover, and the operation panel is electrically connected with the control mainboard.

In one of embodiments, a heat insulation piece is set on the bottom plate, and the heat insulation piece lies above the burning chamber, and a through hole is opened on the heat insulation piece, and the ignition needle penetrates the through hole and extends to the interior of the burning chamber, and an air passage gap is formed between the through hole and the ignition needle.

In one of embodiments, an anti-leakage net lying under the supporting piece is disposed on the base seat, and the anti-leakage net has a shielding zone and a hollow zone, and the shielding zone is aligned with the smoke releasing hole, and the hollow zone is set on the periphery of the shielding zone.

In one of embodiments, a bottom surface of the base seat is provided with a plurality of ridges, and the plurality of ridges are evenly spaced on the bottom surface of the base seat.

In summary, the automatic ignition-type beverage smoking device according to the present invention makes it possible to not only improve convenience and safety, but also achieve efficiently producing smoke and easily cleaning.

BRIEF DESCRIPTION OF THE DRAWINGS

In order to more clearly illustrate technical solution of embodiments of the present invention, we shall briefly describe the figures required to be used in the embodiments.

In order to more clearly illustrate technical solutions of embodiments of the present invention, the figures to be used in examples are briefly described as follows.

DETAILED DESCRIPTION OF SOME EMBODIMENTS

In order to facilitate the understanding of the present invention, we shall comprehensively describe the present invention with reference to the relevant figures as follows. A person skilled in the art can easily understand the other advantages and effects of the present invention from the contents disclosed in this specification. It should be noted that the structure, proportion, size, etc. drawn in the figures of this specification are only used to combine with the content revealed in the specification for a person skilled in the art to understand and read the content, and are not used to impose any limitations on the present invention, so they have no technical substantive significance. Any modification of structures, change of proportional relations or adjustment of sizes, without affecting the effect to be produced and the purpose to be achieved, by the present invention, shall still fall within the scope of the technical content revealed in the present invention. Furthermore, the terms cited in this specification, such as "up", "down", "left", "right" and "middle", only facilitate clear description, and are not used to impose any limitations on the scope of the present invention to be implemented by means of their relative relation changes or adjustments. In the absence of substantive changes in the technical content, it shall also be regarded as the scope of the present invention to be implemented.

Unless otherwise defined, all technical and scientific terms used herein have the same meanings as generally understood by a person skilled in the art. The terms used in the specification of the present invention herein are for the purpose of describing a specific embodiment and are not intended to impose any limitations on the present invention. The term "and/or" as used herein include any and all combinations of one or more items corresponding to it.

Figure 1:
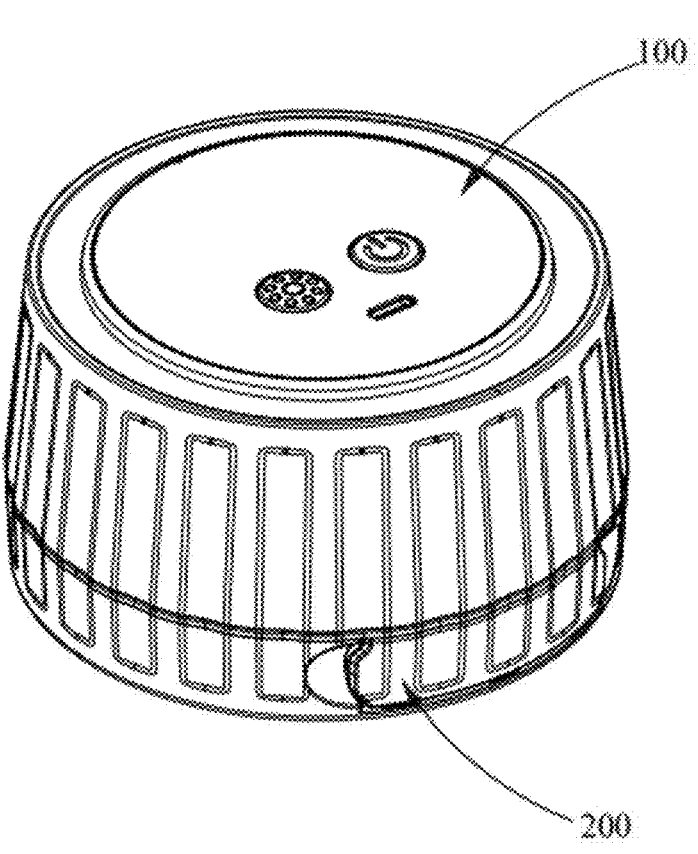
FIG. 1 is a structural diagram of the automatic ignition-type beverage smoking device according to the present invention.
Figure 4:
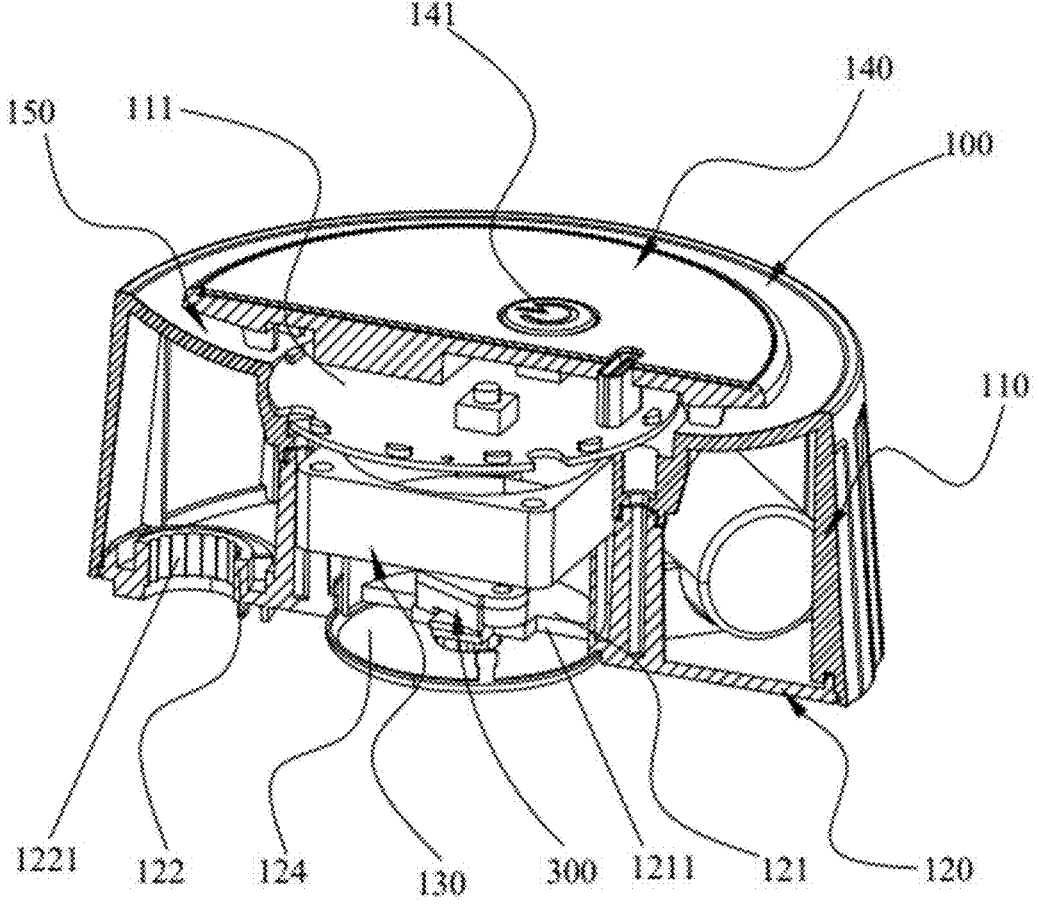
FIG. 4 is a partial section view of the automatic ignition-type beverage smoking device shown in FIG. 1.
Figure 10:
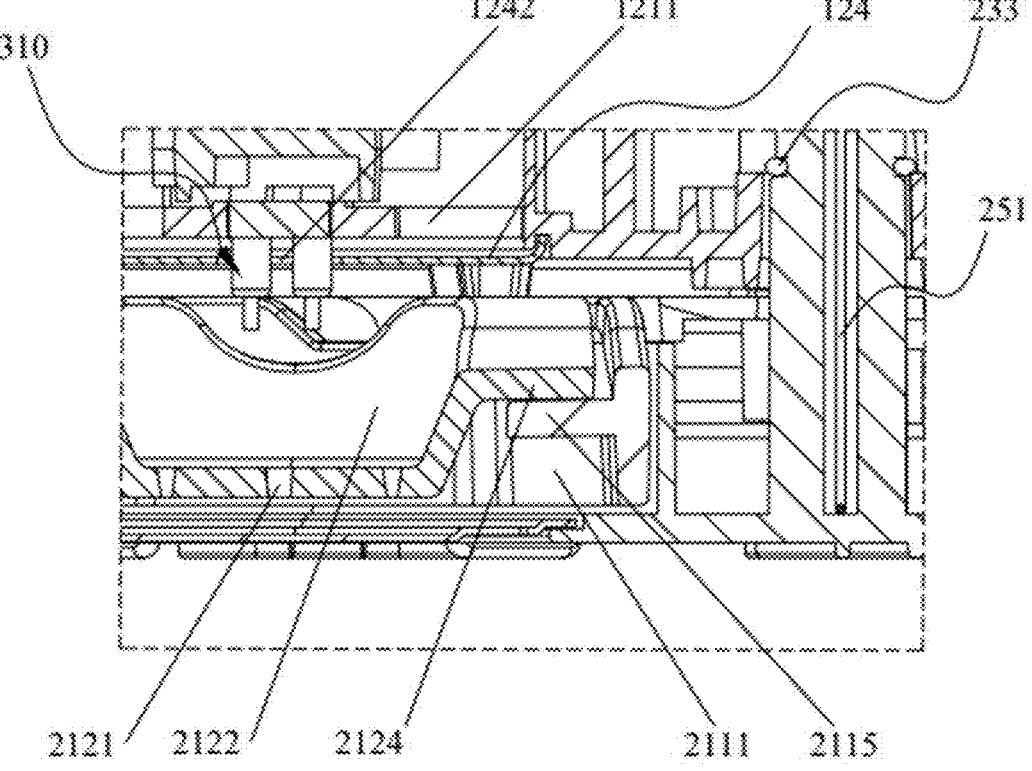
FIG. 10 is a partial enlarged view of A in FIG. 9.

The present invention provides an automatic ignition-type beverage smoking device 10, which aims to not only improve convenience and safety, but also achieve efficiently producing smoke and easily cleaning. As shown in FIG. 1, FIG. 4 and FIG. 10, the automatic ignition-type beverage smoking device 10 includes a main body 100, a base seat 200 and an automatically-igniting apparatus 300, wherein the base seat 200 is rotatably disposed on the main body 100, and the automatically-igniting apparatus 300 is accommodated inside the main body 100.

The main body 100 includes a housing 110 and a bottom plate 120, and a control mainboard 111 electrically connected with the automatically-igniting apparatus 300 is arranged inside the housing110, and a fixing frame 121 is disposed on the bottom plate 120, and the automatically-igniting apparatus 300 is disposed on the fixing frame 121. The automatically-igniting apparatus 300 includes an ignition needle 310, at least part of which penetrates the fixing frame 121. The control mainboard 111 controls turning-on or turning-off of the automatically-igniting apparatus 300, and the ignition needle 310 discharges electricity to generate a spark to ignite a combustible when the automatically-igniting apparatus 300 is turned on.

As shown in FIGS. 4-7, a drawer unit 210 is detachably set inside the base seat 200, and the drawer unit 210 includes a drawer body 211 and a supporting piece 212, and the drawer body 211 has an accommodating chamber 2111, and the supporting piece 212 is separably accommodated in the accommodating chamber 2111, a smoke releasing hole 2121 is set on the supporting piece 212, and the supporting piece 212 is provided with a burning chamber 2122 for containing a combustible. When adding a combustible, the drawer unit 210 is pulled out from the base seat 200, so that the supporting piece 212 emerges, making it possible to add the combustible into the burning chamber 2122.

The ignition needle 310 pokes into the burning chamber 2122, and the smoke generated by burning combustibles diffuses to the outside through the smoke releasing hole 2121. The burning chamber 2122 forms a relatively sealed space, and at the beginning of burning, because of enough air existing in the burning chamber 2111, the combustible can be ignited. During burning, there is no excessive air to be supplemented, so that the combustible remains incomplete burning, resulting in smoke, which slowly sinks under the action of gravity and finally diffuses to the outside through the smoke releasing hole 2121.

Figure 5:
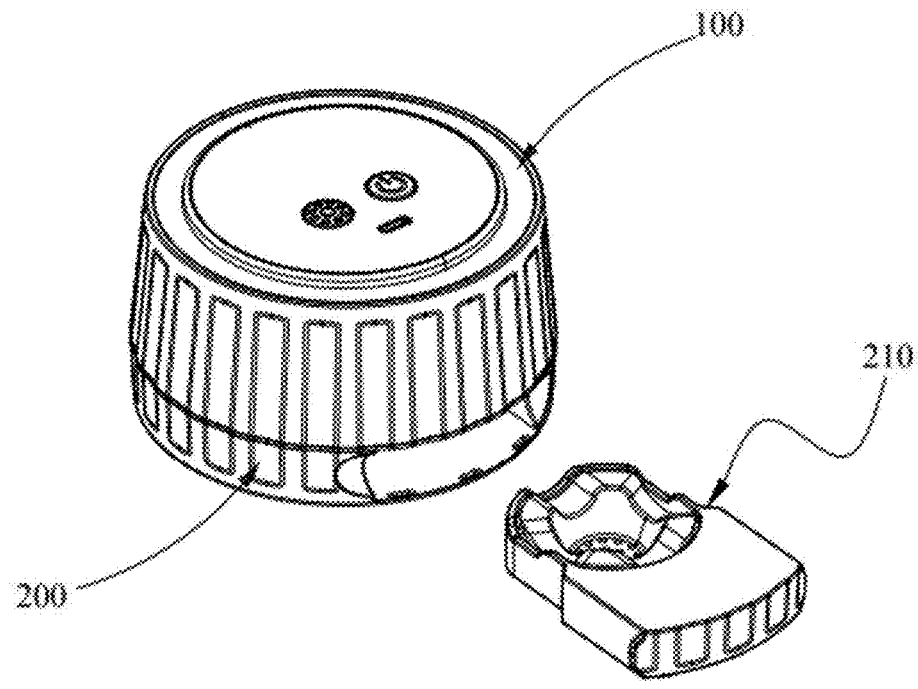
FIG. 5 is a diagram showing how to use the automatic ignition-type beverage smoking device shown in FIG. 1.

Referring to FIG. 4 and FIG. 5, we shall explain the operation principle of the automatic ignition-type beverage smoking device 10 in combination with the above structure.

During use, users pull out the drawer unit 210 from the base seat 200, then add the combustible to the burning chamber 2122, and then push the drawer unit 210 back into the base nest 200, next place the automatic ignition-type beverage smoking device 10 on a container containing beverages and turn on the automatically-igniting apparatus 300, so that the ignition needle 310 generates a spark to ignite the combustible, thereupon then produce flavored smoke. The smoke flows into the container containing beverages under gravity, in this way the molecules within it dissolve in a beverage, thereupon then give the beverage a smoky flavor and add flavor complexity. The design of using the automatically-igniting apparatus 300 to ignite to generate smoke can make the operation more convenient and cannot produce a flame, providing high safety.

Figure 6:
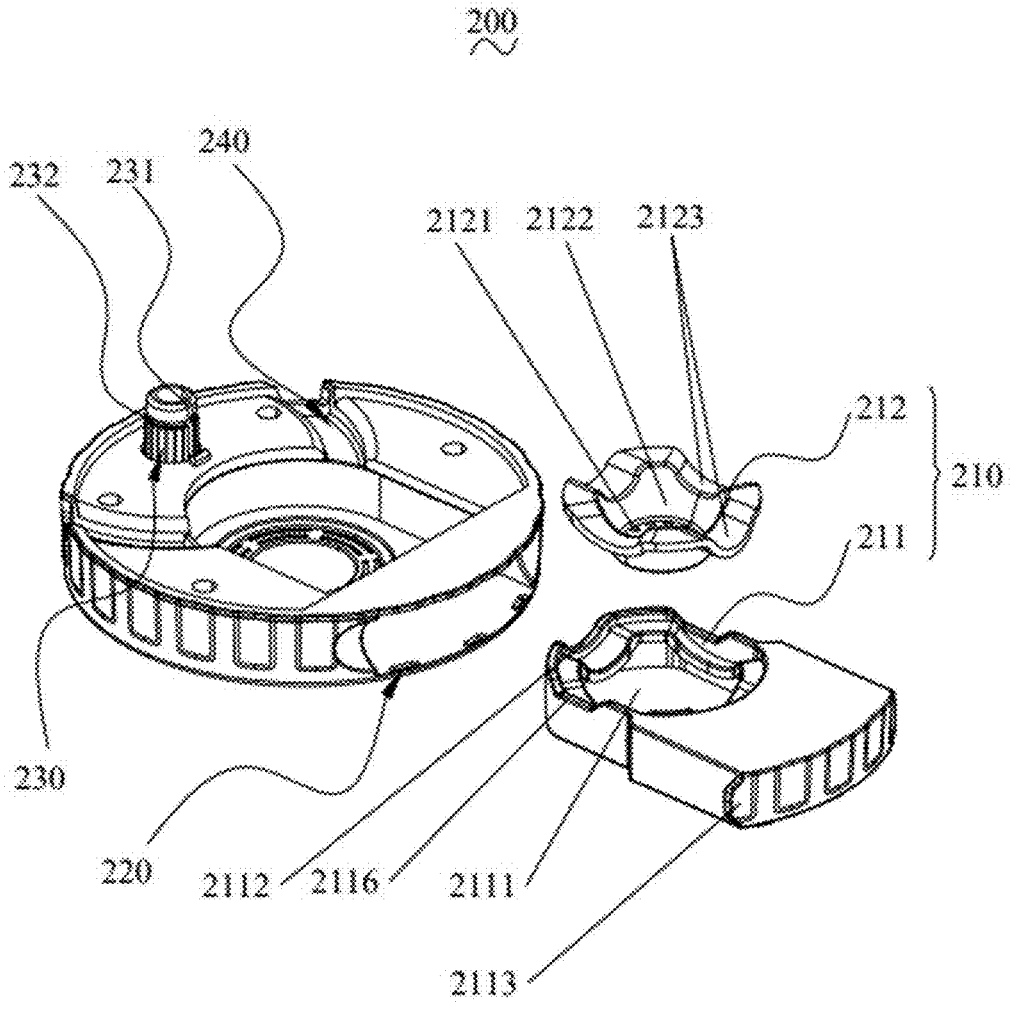
FIG. 6 is an exploded view (1) of the base seat shown in FIG. 3.

Preferably, as shown in FIG. 6 and FIG. 10, a dodging groove 2112 is opened on an outer wall of the accommodating cavity 2111, and a concave portion 2123 that fits with the dodging groove 2112 is set on an edge of the supporting piece 212. In the process of pulling out or pushing back the drawer unit 210, the ignition needle 310 moves inside the dodging groove 2112 and the concave portion 2123, avoiding the ignition needle 310 from damage caused by the contact between the drawer unit 210 and the ignition needle 310, meanwhile making it possible to pull out or push back the drawer assembly 210 smoothly.

Figure 7:
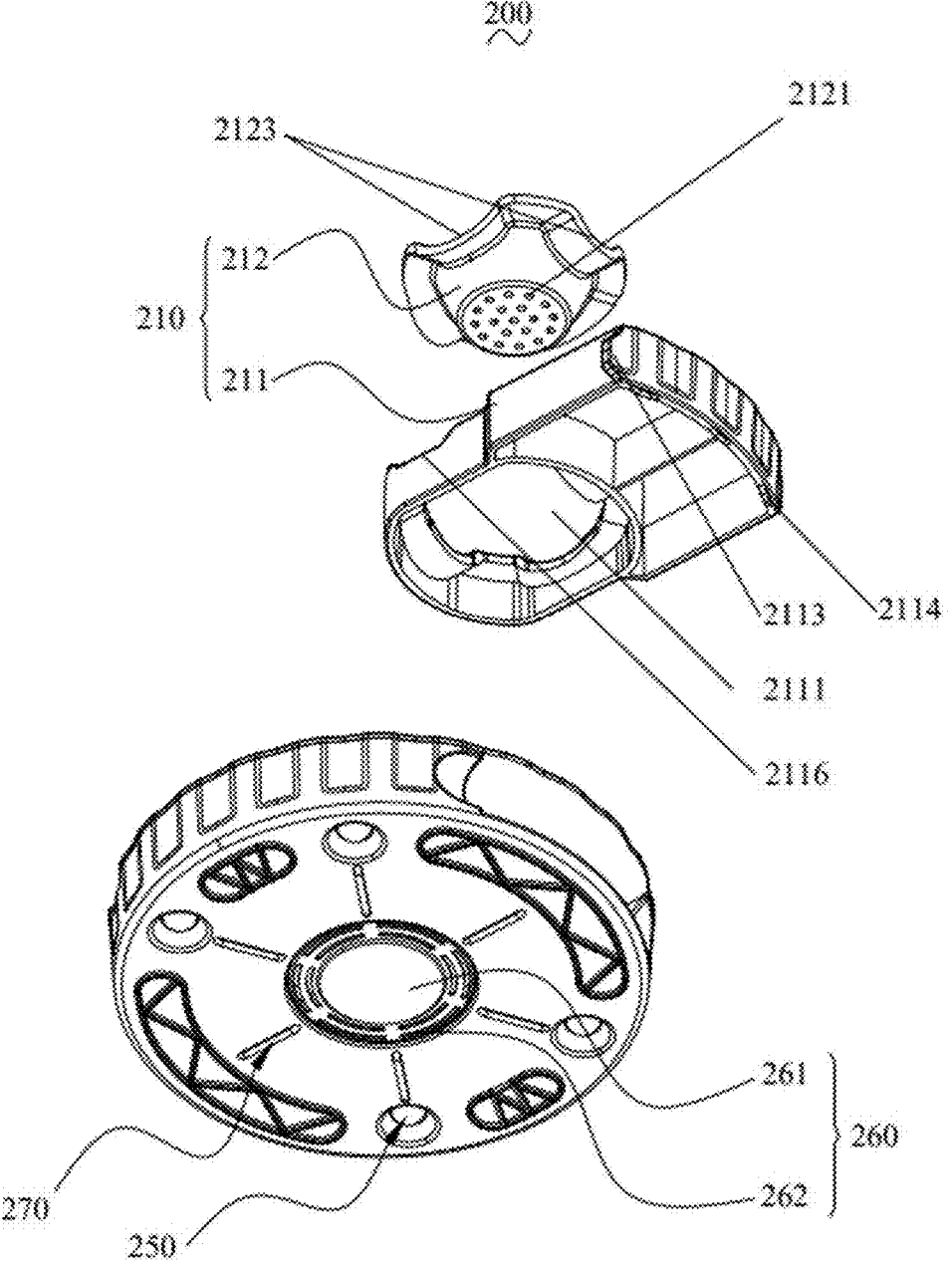
FIG. 7 is an exploded view (2) of the base seat shown in FIG. 3.

As shown in FIG. 6 and FIG. 7, the drawer body has a handle 2113, and a position-restricting protrusion 2114 is set on the handle 2113, and a position-restricting groove 220 that fits with the position-restricting protrusion 2114 is set on the base seat 200. Users can pull out or push back the drawer unit 210 by gripping the handle 2113. After pushing the drawer unit 210 back into position, the drawer unit 210 is jammed inside the base seat 200 by way of making the position-restricting groove 220 fit with the position-restricting protrusion 2114, so as to avoid the drawer unit 210 from being pulled out of the base seat 200 after the drawer unit 210 is pushed back into position; in addition, after pushing the drawer unit 210 back into position, users can perceive whether the position-restricting groove 220 fits with the position-restricting protrusion 2114 by hand feeling; in this way, it is possible to remind the users that the drawer unit 210 has been installed at this time, so as to avoid the users from continuing to push back after the drawer unit 210 is installed, resulting in damage to the drawer unit 210.

Figure 8:
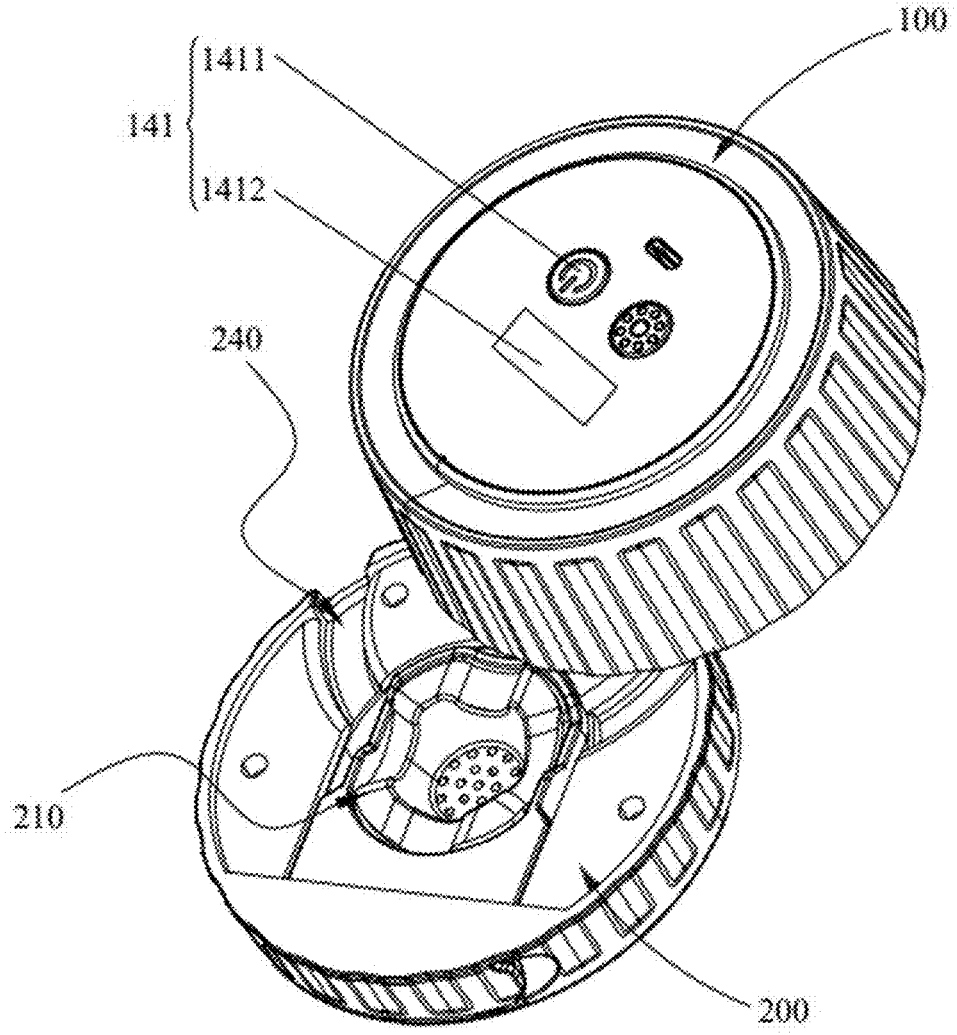
FIG. 8 shows a use status of the main body and base seat during rotating as shown in FIG. 1.

Further, combustibles will also produce tar and particle residues during burning, and the tar will adhere to the base seat 200, imposing a bad impact on user's experience, so it is necessary to clean off the tar regularly. However, as shown in FIG. 5 and FIG. 6, the depth of the groove for making the drawer unit 210 fit with the base seat 200 is quite big, so it is more difficult for the users to clean it; therefore, the base seat 200 and the main body 100 in the present invention are rotatably connected with each other, so as to make cleaning convenient. Specifically, as shown in FIG. 8, during cleaning it is only necessary to rotate the base seat 200 to move away from the main body 100, so that the inner wall of the base seat 200 emerges, so as to make it easy for the users to clean off the tar.

In the present invention, as shown in FIG. 6 and FIG. 10, a rotating column 230 is disposed on the base seat 200, and the rotating column 230 has a notch 231, which is designed to make the rotating column 230 have a certain elasticity under a radial pressure. A locking groove 232 is further set on the rotating column 230, and a locking washer 233 is nested in the locking groove 232. A propping sleeve 122 that fits with the rotating column 230 is set the bottom plate 120, and the rotating column 230 penetrates the propping sleeve 122, which is clamped by the locking washer 233. It is understandable that in the process of making the rotating column 230 penetrate the propping sleeve 122, the rotating column 230 and the locking washer 233 retract inwards under the squeezing of the inner wall of the propping sleeve 122, and the diameters of the propping sleeve 122 and the locking washer 233 decrease until the locking groove 232 lies outside the propping sleeve 122, at this time the locking washer 233 is no longer squeezed by the inner wall of the propping sleeve 122, and then the locking washer 233 returns to its original state, so as to clamp the propping sleeve 122, and prevent the rotating column 230 from escaping from the propping sleeve 122, thereupon realizing rotating the base seat 200 with respect to the main body 100 while ensuring stability of connection.

Preferably, as shown in FIG. 6 and FIG. 10, a dodging channel 240 is set on the base seat 200, and the dodging channel 240 is conjured to dodge the ignition needle 310 when the base seat 200 rotates, and a dodging groove 2116 that fits with the dodging channel 240 is set on the outer wall of the accommodating cavity 2111, and the concave portion 2123 is provided with a plurality, and the concave portion 2123 fits with the dodging groove 2116. In the process of rotating the base seat 200 with respect to the main body 100, the ignition needle 310 moves inside the dodging channel 240, the dodging groove 2116 and the concave portion 2123, avoiding the problem of damage to the ignition needle 310 caused by the base seat 200 hitting the ignition needle 310, and ensuring smooth rotation with respect to the main body 100 and the base seat 200. It is understandable that the concave portion 2123 is provided with a plurality, and the concave portion 2123 simultaneously fits with the dodging groove 2116 and the dodging groove 2112, so that the supporting piece 212 can be placed in the accommodating chamber 2111 at any angle without obstructing the rotation of the base seat 200.

Figure 3:
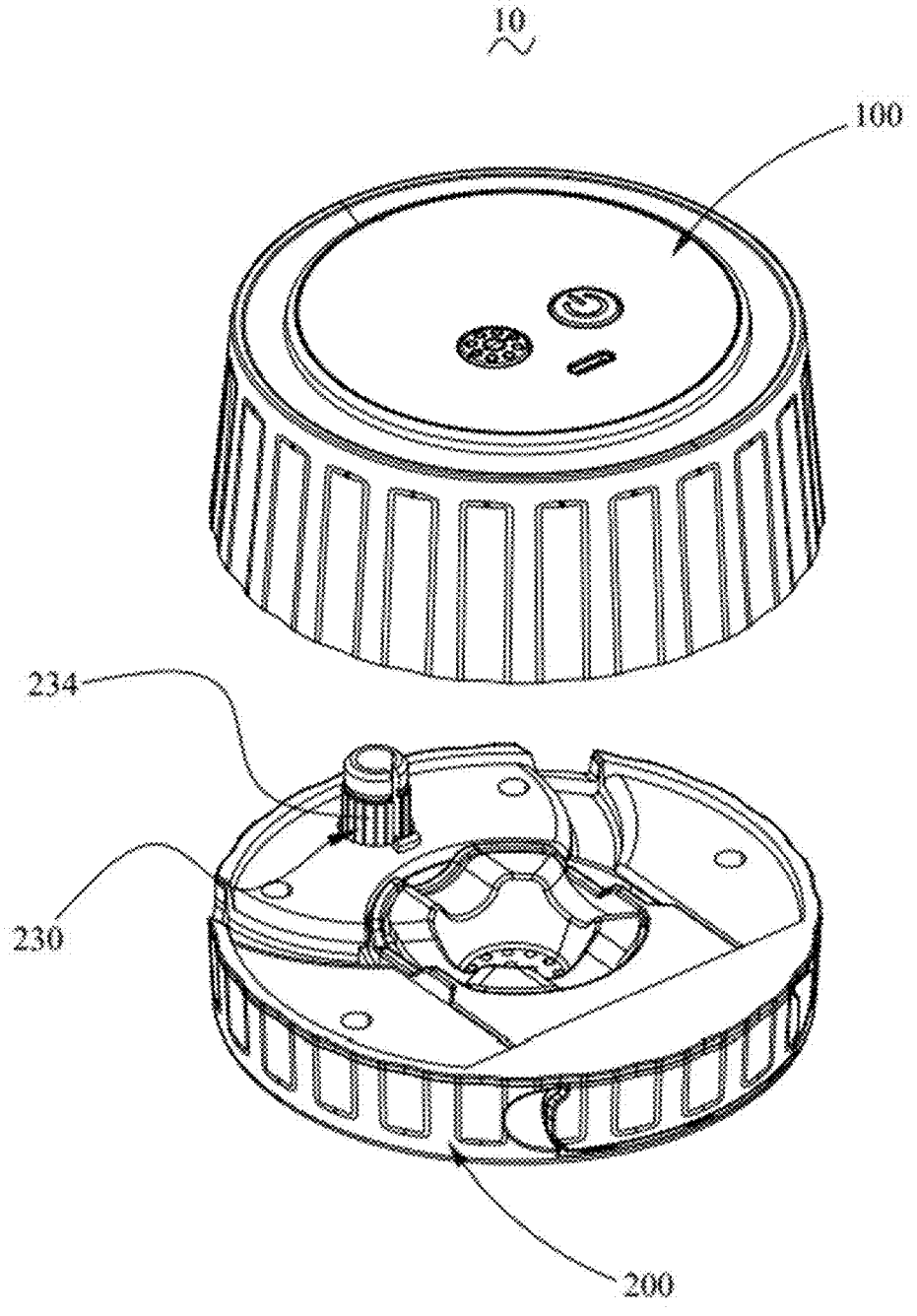
FIG. 3 is an exploded view of the automatic ignition-type beverage smoking device shown in FIG. 1.

Preferably, as shown in FIG. 3 and FIG. 4, a plurality of convex edges 234 are uniformly arranged in a circumferential direction of an outer side of the rotating column 230, and a plurality of strip-shaped grooves 1221 that fit with the plurality of convex edge 234 respectively are uniformly arranged in a circumferential direction of an inner side of the propping sleeve 122. In this way, each convex edge 234 is jammed in each strip-shaped groove 1221 during use, so as to make the base seat 200 stick at any angle during rotation, avoiding a sliding movement between the main body 100 and the base seat 200, which influences user's experience.

Figure 2:
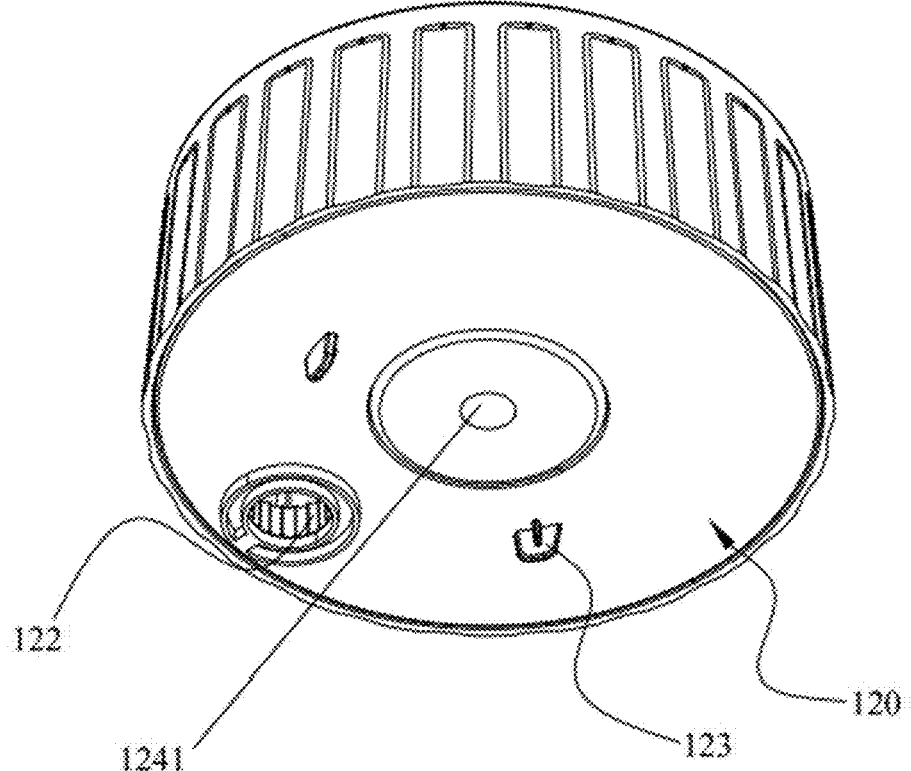
FIG. 2 is a structural diagram of the main body shown in FIG. 1.

Preferably, as shown in FIG. 2 and FIG. 6, a plugging tab 123 that fits with the dodging channel 240 is set on the bottom plate 120, and the plugging tab 123 is accommodated inside the dodging channel 240. In this way, the plugging tab 123 prevents the smoke from escaping to the outside through the dodging channel 240, so that most of the smoke flows into a container containing beverages, avoiding users from taking more time to wait and improving user's experience.

Further, in the present invention, as shown in FIG. 4 and FIG. 6, the main body 100 includes a top cover 140, and a ventilation gap 150 is formed between the top cover 140 and the housing110, and the ventilation gap 150 connects the outside with the interior of the main body 100, and an air-delivering hole 1211 is set on the fixing frame 121, and the air-delivering hole 1211 connects the interior of the main body 100 with the burning chamber 2122. During operation, since the combustible consumes oxygen during burning, a negative pressure is formed inside the supporting piece 212 close to the burning chamber 2122, so environmental air is suctioned into the interior of the main body 100 through the ventilation gap 150, and then enters the burning chamber 2122 through the air-delivering hole 1211, so as to provide oxygen to burn the combustible, raising the rate of burning combustibles, and achieving efficiently producing smoke.

Figure 9:
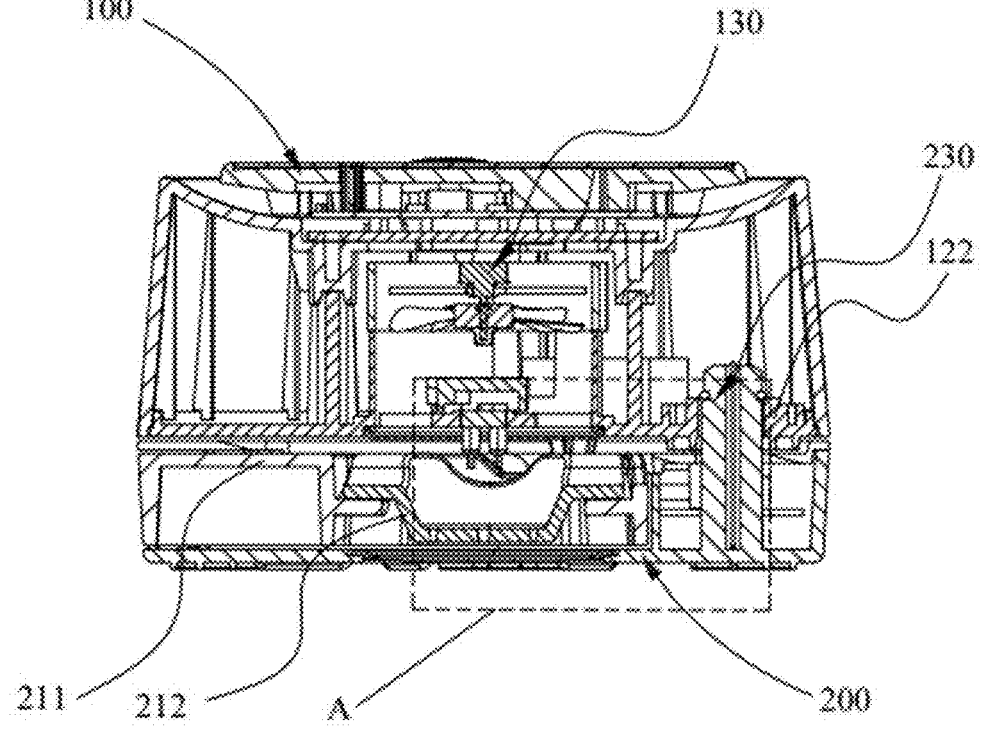
FIG. 9 is a 2D section view of the automatic ignition-type beverage smoking device shown in FIG. 1.

Preferably, as shown in FIG. 4, FIG. 9 and FIG. 10, an air blower unit 130 is disposed inside the main body 100, and the air blower unit 130 is fixedly mounted on the fixing frame 121, and the air blower unit 130 is electrically connected with the control mainboard 111, and the air blower unit 130 is configured to drive air to flow inside the main body 100. During operation, the control mainboard 111 controls the air blower unit 130 to turn on or turn off; in this way, the air blower unit 130 is turned on and generates a descending airflow, thereupon driving the smoke to sink. At the same time, the flowing air continuously provides fresh oxygen to the burning chamber 2122, which accelerates burning the combustible and raises the rate of producing smoke. In this way, the automatic ignition-type beverage smoking device 10 produces smoke quickly, avoiding users from taking more time to wait.

It should be summarized that compared with the prior art, the automatic ignition-type beverage smoking device 10 according to the present invention has the following advantages.

First, it is possible to ignite the combustible in the burning chamber 2122 by means of the automatically-igniting apparatus 300, providing convenient operation, no flame, and high safety.

Second, it is possible to detachably arrange the drawer unit 210 in the accommodating chamber 2111, and for the user to replace the combustible by way of pulling out and pushing back the drawer unit 210, allowing convenient operation and making an improvement for user's experience;

Third, it is possible to rotatably connect the base 200 with the main body 100, providing convenience for users to clean off residues and easiness to operate.

Fourth, by specially designing an air inlet path, it is possible to make environmental air smoothly enter the burning chamber 2122 to provide oxygen for burning, on this basis, setting the air blower unit 130 effectively accelerates burning the combustible and raises the rate of producing smoke, so that the automatic ignition-type beverage smoking device 10 can efficiently produce smoke and avoid users from taking more time to wait.

It should be emphasized that in an actual product, the supporting piece 212 is made of metal, so as to avoid high temperature generated during burning from influencing the supporting piece 212, but the drawer body 211, the fixing frame 121 and main body 100 are partially made of plastic and cannot withstand high temperature. Since the drawer body 211 and the fixing frame 121 are close to the supporting piece 212, the high temperature generated during burning may damage the drawer unit 210 or the fixing frame 121, and at the same time, heat enters the main body 100 directly through the air-delivering hole 1211, so it may damage part of the structure within the main body 100. The present invention makes the following special designs to solve the above problem.

Preferably, as shown in FIG. 10, the edge of the supporting piece 212 extends outwards to form an outer edge 2124, and an extension block 2115 that fits with the outer edge 2124 is set on the inner wall of the accommodating cavity 2111, and only the outer edge 2124 is in contact with the extension block 2115 when the supporting piece 212 is placed in the accommodating cavity 2111. Understandably, the heat generated during burning needs to be transmitted from the outer edge 2124 to the extension block 2115, and then from the extension block 2115 to the inner wall of the accommodating cavity 2111, in this way, the heat transmitted to the inner wall of the accommodating cavity 2111 decreases due to the loss of heat during transmitting.

In addition, as shown in FIG. 2, FIG. 4 and FIG. 10, a heat insulation piece 124 is set on the bottom plate 120, and the heat insulation piece 124 lies above the burning chamber 2122, and a through hole 1241 is opened on the heat insulation piece 124, and the ignition needle 310 penetrates the through hole 1241 and extends to the interior of the burning chamber 2122, and an air passage gap 1242 is formed between the through hole 1241 and the ignition needle 310. Preferably, the heat insulation piece 124 is made of metal. The heat insulation piece 124 can obstruct the heat generated during burning from being transmitted to the fixing frame 121, so as to protect the fixing frame 121, and simultaneously prevent the heat from entering the main body 100 through the air-delivering hole 1211, so as to protect part of the structure within the main body 100. In addition, since air can flow into the burning chamber 2122 through the air passage gap 1242, setting the heat insulation piece 124 will not obstruct airflow, nor change a path of the current airflow.

Therefore, compared with the prior art, by way of specially designing the automatic ignition-type beverage smoking device 10 in the present invention, it is possible to reduce the heat transmitted to the drawer body 211, the fixing frame 121 and the main body 100 and avoid part of the structure within the drawer body 211, the fixing frame 121 and the main body 100 from being heated and damaged.

In some examples, as shown in FIG. 7, an anti-leakage net 260 lying under the supporting piece 212 is disposed on the base seat 200, and the anti-leakage net 260 has a shielding zone 261 and a hollow zone 262, and the shielding zone 261 is aligned with the smoke releasing hole 2121, and the hollow zone 262 is set on the periphery of the shielding zone 261. The residue from burning the combustible falls into the shielding zone 261, and the smoke flows into a container containing beverages through the hollow zone 262. In this way, it is possible to solve the problem that the residue from burning the combustible falls into the container containing beverages, and improve user's experience.

In some examples, as shown in FIG. 7, a bottom surface of the base seat 200 is provided with a plurality of ridges 270, and the plurality of ridges 270 are evenly spaced on the bottom surface of the base seat 200. In this way, when the automatic ignition-type beverage smoking device 10 is placed on a container containing beverages, the plurality of ridges 270 lie against the container containing beverages, so that a gap is formed between the bottom of the automatic ignition-type beverage smoking device 10 and the container containing beverages, and air in the container containing beverages flows to the outside through this gap, so as to balance the air pressure to make it easy for smoke to enter the container containing beverages.

In some examples, as shown in FIG. 4, FIG. 6, FIG. 7 and FIG. 10, a LED lamp assembly 250 is disposed on the base seat 200, and the LED lamp assembly 250 is electrically connected with the control mainboard 111 by means of a wire 251, and the wire 251 passes through the rotating column 230. In this way, a beam emitted by the LED lamp assembly 250 can illuminate the container containing beverages, making it easier for users to observe a smoke-making process, while enhancing a user's mood and improving user's experience. It should be explained that the wire 251 enters the rotating column 230 through the notch 231, so as to connect the control mainboard 111 by way of passing through the rotating column 230, so that the wire 251 will not obstruct the base seat 200 from rotating, and the rotation of the base seat 200 will not cause damage to the wire 251, meanwhile no wire is exposed, making the structure of the automatic ignition-type beverage smoking device 10 simple.

In some examples, as shown in FIG. 4, FIG. 7 and FIG. 8, an operation panel 141 is set on the top cover 140, and the operation panel 141 is electrically connected with the control mainboard 111. In this way, users can control the automatically-igniting apparatus 300, the air blower unit 130 and the LED light assembly 250 to turn on or turn off by using the operation panel 141. Specifically, buttons 1411 for controlling the automatically-igniting apparatus 300, the air blower unit 130 and the LED light assembly 250 are set on the operation panel 141, and such buttons may be mechanical or controllable by touching. Further, a display screen 1412 is further set on the operation panel 141, and configured to display a battery level and a countdown to finish producing smoke.

In summary, the automatic ignition-type beverage smoking device 10 according to the present invention makes it possible to not only improve convenience and safety, but also achieve efficiently producing smoke and easily cleaning.

The above examples only express several embodiments of the present invention, and descriptions to them are more specific and detailed, but they cannot be understood as a limitation to the scope of the prevent invention. It should be noted that a person skilled in the art may make a number of modifications and improvements without departing from the concept of the present invention, which fall within the protection scope of the invention. Therefore, the protection scope of the invention patent shall be subject to the attached claims.

What is claimed is:

1. An automatic ignition-type beverage smoking device comprising a main body, a base seat and an automatically-igniting apparatus, wherein the base seat is rotatably disposed on the main body, and the automatically-igniting apparatus is accommodated inside the main body;

wherein the main body includes a housing and a bottom plate, and a control mainboard electrically connected with the automatically-igniting apparatus is arranged inside the housing, and a fixing frame is disposed on the bottom plate, and the automatically-igniting apparatus is disposed on the fixing frame, and the automatically-igniting apparatus includes an ignition needle, at least part of which penetrates the fixing frame;

wherein a drawer unit is detachably set inside the base seat, and the drawer unit includes a drawer body and a supporting piece, and the drawer body has an accommodating chamber, and the supporting piece is separably accommodated in the accommodating chamber, and a smoke releasing hole is set on the supporting piece, and the supporting piece is provided with a burning chamber for containing a combustible, and the ignition needle pokes into the burning chamber, so that smoke generated by burning combustibles diffuses to the outside through the smoke releasing hole.

2. The automatic ignition-type beverage smoking device according to claim 1, wherein a dodging groove is opened on an outer wall of the accommodating cavity, and a concave portion that fits with the dodging groove is set on an edge of the supporting piece.

3. The automatic ignition-type beverage smoking device according to claim 1, wherein the drawer body has a handle, and a position-restricting protrusion is set on the handle, and a position-restricting groove that fits with the position-restricting protrusion is set on the base seat.

4. The automatic ignition-type beverage smoking device according to claim 1, wherein the edge of the supporting piece extends outwards to form an outer edge, and an extension block that fits with the outer edge is set on an inner wall of the accommodating cavity.

5. The automatic ignition-type beverage smoking device according to claim 1, wherein a rotating column is disposed on the base seat, and the rotating column has a notch, and a locking groove is set on the rotating column, and a locking washer is arranged in the locking groove; a propping sleeve that fits with the rotating column is set the bottom plate, and the rotating column penetrates the propping sleeve, which is clamped by the locking washer;

a dodging channel is set on the base seat, and the dodging channel is conjured to dodge the ignition needle when the base seat rotates, and a dodging groove that fits with the dodging channel is set on an outer wall of the accommodating cavity.

6. The automatic ignition-type beverage smoking device according to claim 5, wherein a plurality of convex edges are uniformly arranged in a circumferential direction of an outer side of the rotating column, and a plurality of strip-shaped grooves that fit with the plurality of convex edge respectively are uniformly arranged in a circumferential direction of an inner side of the propping sleeve.

7. The automatic ignition-type beverage smoking device according to claim 5, wherein a plugging tab that fits with the dodging channel is set on the bottom plate, and the plugging tab is accommodated inside the dodging channel.

8. The automatic ignition-type beverage smoking device according to claim 5, wherein a LED lamp assembly is disposed on the base seat, and the LED lamp assembly is electrically connected with the control mainboard by means of a wire, and the wire passes through the rotating column.

9. The automatic ignition-type beverage smoking device according to claim 1, wherein the main body includes a top cover, and a ventilation gap is formed between the top cover and the housing, and the ventilation gap connects the outside with the interior of the main body, and an air-delivering hole is set on the fixing frame, and the air-delivering hole connects the interior of the main body with the burning chamber.

10. The automatic ignition-type beverage smoking device according to claim 9, wherein an air blower unit is disposed inside the main body, and the air blower unit is fixedly mounted on the fixing frame, and the air blower unit is electrically connected with the control mainboard, and the air blower unit is configured to drive air to flow inside the main body.

11. The automatic ignition-type beverage smoking device according to claim 9, wherein an operation panel is set on the top cover, and the operation panel is electrically connected with the control mainboard.

12. The automatic ignition-type beverage smoking device according to claim 9, wherein a heat insulation piece is set on the bottom plate, and the heat insulation piece lies above the burning chamber, and a through hole is opened on the heat insulation piece, and the ignition needle penetrates the through hole and extends to the interior of the burning chamber, and an air passage gap is formed between the through hole and the ignition needle.

13. The automatic ignition-type beverage smoking device according to claim 1, wherein an anti-leakage net lying under the supporting piece is disposed on the base seat, and the anti-leakage net has a shielding zone and a hollow zone, and the shielding zone is aligned with the smoke releasing hole, and the hollow zone is set on the periphery of the shielding zone.

14. The automatic ignition-type beverage smoking device according to claim 1, wherein a bottom surface of the base seat is provided with a plurality of ridges, and the plurality of ridges are evenly spaced on the bottom surface of the base seat.

\* \* \* \* \*